US012401898B2

(12) United States Patent
Saito (10) Patent No.: US 12,401,898 B2
(45) Date of Patent: Aug. 26, 2025

(54) IMAGE PROCESSING APPARATUS AND METHOD, AND IMAGE CAPTURING APPARATUS

(71) Applicant: CANON KABUSHIKI KAISHA, Tokyo (JP)

(72) Inventor: Junichi Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 18/335,180

(22) Filed: Jun. 15, 2023

(65) Prior Publication Data

US 2023/0421901 A1 Dec. 28, 2023

(30) Foreign Application Priority Data

Jun. 27, 2022 (JP) ................................. 2022-102865

(51) Int. Cl.
*H04N 23/68* (2023.01)
*G06T 7/215* (2017.01)
*G06T 7/246* (2017.01)

(52) U.S. Cl.
CPC ......... *H04N 23/6811* (2023.01); *G06T 7/215* (2017.01); *G06T 7/246* (2017.01)

(58) Field of Classification Search
CPC ...... H04N 23/6811; G06T 7/215; G06T 7/246
USPC ...................................................... 348/208.1
See application file for complete search history.

(56) References Cited

U.S. PATENT DOCUMENTS

| 2015/0256737 A1* | 9/2015 | Saito | H04N 23/635 |
| | | | 348/349 |
| 2019/0147601 A1* | 5/2019 | Kakuko | G06T 7/215 |
| | | | 382/103 |

FOREIGN PATENT DOCUMENTS

| JP | 2004-356683 A | 12/2004 |
| JP | 2019-174608 A | 10/2019 |

* cited by examiner

*Primary Examiner* — Joel W Fosselman
(74) *Attorney, Agent, or Firm* — Carter, DeLuca & Farrell LLP (57) ABSTRACT

An image processing apparatus comprises: a first detector that detects a subject area of a predetermined subject from each of a plurality of images; a second detector that detects a partial area of a predetermined size that includes the subject area from each of the plurality of images; a feature point detector that detects a feature point of an image; and a synthesizer that synthesizes the partial areas of the plurality of images so that the feature points in the subject areas match each other.

13 Claims, 8 Drawing Sheets

IMAGE PROCESSING APPARATUS AND METHOD, AND IMAGE CAPTURING APPARATUS

BACKGROUND OF THE INVENTION

Field of the Invention

The present invention relates to an image processing apparatus and method, and an image capturing apparatus, and more particularly to a technique for aligning and synthesizing a plurality of images obtained by continuous shooting.

Description of the Related Art

In shooting with a camera, it is very difficult to capture a subject moving around within the angle of view with an appropriate composition. In a case where the camera is set at a fixed point, it is necessary to shoot with the fastest possible shutter speed, but shooting with a fast shutter speed may result in an image lacking a sense of dynamism. In addition, for example, when the subject is a person, there is a possibility that the subject may be shot in a generally undesirable state, such as with his/her eyes closed due to blinking, etc., during the short exposure period of the fast shutter speed.

Japanese Patent Laid-Open No. 2004-356683 discloses to periodically perform image shooting using a plurality of cameras, and control to save images of a person whose eyes are not closed, and discard images with unfavorable facial expression such as closed-eyes images due to blinking.

On the other hand, in a case of shooting an image with holding the camera in hand, the photographer can follow the subject, so the composition of an image may be more stable than an image shot with a fixed-point camera, but a lack of dynamism will not be avoided if shooting is performed at fast shutter speeds. Further, shooting with slow shutter speeds, such as shooting while panning, requires a high-level skill.

Japanese Patent Laid-Open No. 2019-174608 discloses a method in which the motion of a subject is predicted from the motion vector of the image data as a panning reference angular velocity, and camera shake correction means is controlled to keep the subject at the same position in the image based on the difference between the panning reference angular velocity and the panning velocity of the camera. According to this method, it is possible to easily shoot a so-called panning image in which the subject is less blurred and the background flows.

However, in the method disclosed in Japanese Patent Laid-Open No. 2004-356683, since a plurality of cameras are used, more camera installation space is required than in the case of shooting with a single camera, and running costs increase.

In addition, even if shooting is performed with a single camera or if with a plurality of cameras as disclosed in Japanese Patent Laid-Open No. 2004-356683, since shooting is performed with a fast shutter speed to capture the moment, a sense of dynamism, etc. may not be expressed. In addition, Japanese Patent Laid-Open No. 2019-174608 discloses to predict the motion of the subject, however, it is difficult to predict the motion of the subject in a case where the motion of the subject is complex and the subject moves differently from the predicted motion during long exposure period. In such a case, it is difficult to perform panning shooting properly.

SUMMARY OF THE INVENTION

The present invention has been made in consideration of the above situation, and is to acquire an image with dynamism.

According to the present invention, provided is an image processing apparatus comprising one or more processors and/or circuitry which function as: a first detector that detects a subject area of a predetermined subject from each of a plurality of images; a second detector that detects a partial area of a predetermined size that includes the subject area from each of the plurality of images; a feature point detector that detects a feature point of an image; and a synthesizer that synthesizes the partial areas of the plurality of images so that the feature points in the subject areas match each other.

Further, according to the present invention, provided is an image capturing apparatus comprising: an image sensor; and one or more processors and/or circuitry which function as: a first detector that detects a subject area of a predetermined subject from each of a plurality of images shot by the image sensor; a second detector that detects a partial area of a predetermined size that includes the subject area from each of the plurality of images; a feature point detector that detects a feature point of an image; and a synthesizer that synthesizes the partial areas of the plurality of images so that the feature points in the subject areas match each other.

Furthermore, according to the present invention, provided is an image processing method comprising: detecting a subject area of a predetermined subject from each of a plurality of images; detecting a partial area of a predetermined size that includes the subject area from each of the plurality of images; detecting a feature point of an image; and synthesizing the partial areas of the plurality of images so that the feature points in the subject areas match each other.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

A first embodiment of the present invention will be described with reference to FIGS. 1 to 3B.

Figure 1:
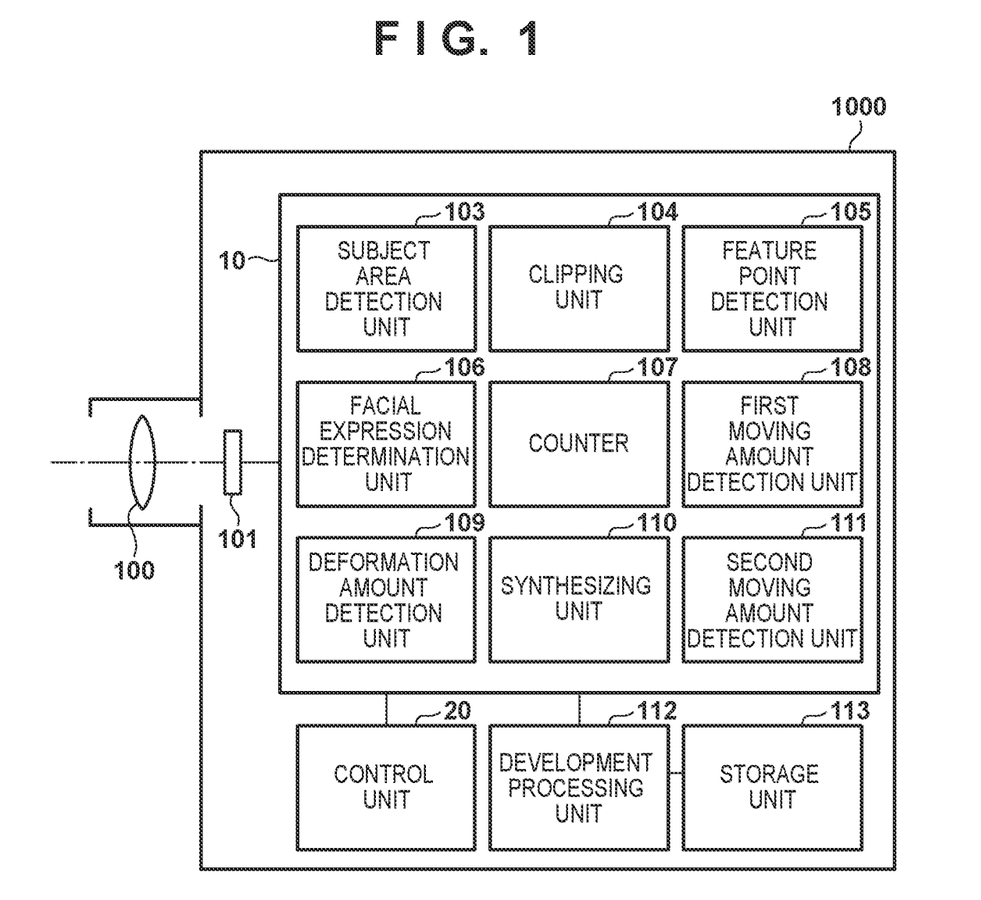
FIG. 1 is a block diagram showing a functional configuration of an image capturing apparatus according to a first embodiment of the invention.

FIG. 1 is a block diagram showing the functional configuration of an image capturing apparatus 1000 as an example of an apparatus that performs image processing according to the present invention. In the first embodiment, the image capturing apparatus 1000 is assumed to be a so-called fixed-point camera, and explanation will be given assuming a case where the image capturing apparatus 1000 is set near an attraction of an amusement park to take pictures of users enjoying the attraction and the pictures are provided to the users as contents. It should be noted that the present invention is not limited to a fixed-point camera, and can also be applied to a camera such as a general digital camera that is mainly used in hand-held shooting.

Light from a subject passes through an optical system 100 and forms an image on an image sensor 101. The image sensor 101 is an imaging element including a photoelectric conversion device such as a CMOS sensor or a CCD sensor covered by a Bayer-arrayed color filter. A formed optical image of a subject is photoelectrically converted at each pixel and read out as an image signal. The read image signal is sent to an image signal processing unit 10, and various kinds of processing are performed on the image signal there.

In the image signal processing unit 10, a subject area detection unit 103 detects the subject and an area of the subject in an image represented by the read image signal. A clipping unit 104 clips a specific portion of the read image signal. A feature point detection unit 105 detects edges and the like in the image as feature points. A facial expression determination unit 106 determines the facial expression when a person's face is recognized as a subject. A counter 107 counts the number of images continuously shot.

A first moving amount detection unit 108 detects a moving amount of a feature point between a plurality of continuously shot images. A second moving amount detection unit 111 detects moving amounts of feature points in the peripheral area around the subject detected by the subject area detection unit 103. A deformation amount detection unit 109 detects a deformation amount of shape of a face caused by a change in the face direction when a person's face is recognized as a subject. Further, in a case where an object other than a person's face is recognized as a subject, the deformation amount detection unit 109 detects the deformation amount of the subject.

A synthesizing unit 110 synthesizes a plurality of continuously shot images into one image while aligning the positions of the images using a predetermined method. Note that the synthesizing method will be described later in detail.

A control unit 20 controls each component of the image signal processing unit 10 so as to supply the processed image signal to a development processing unit 112 based on user settings, shooting conditions, and the like, and controls the entire image capturing apparatus 1000. When the development processing by the development processing unit 112 is completed, the image signal is stored in a storage unit 113, and a series of shooting operations is completed.

Figure 2:
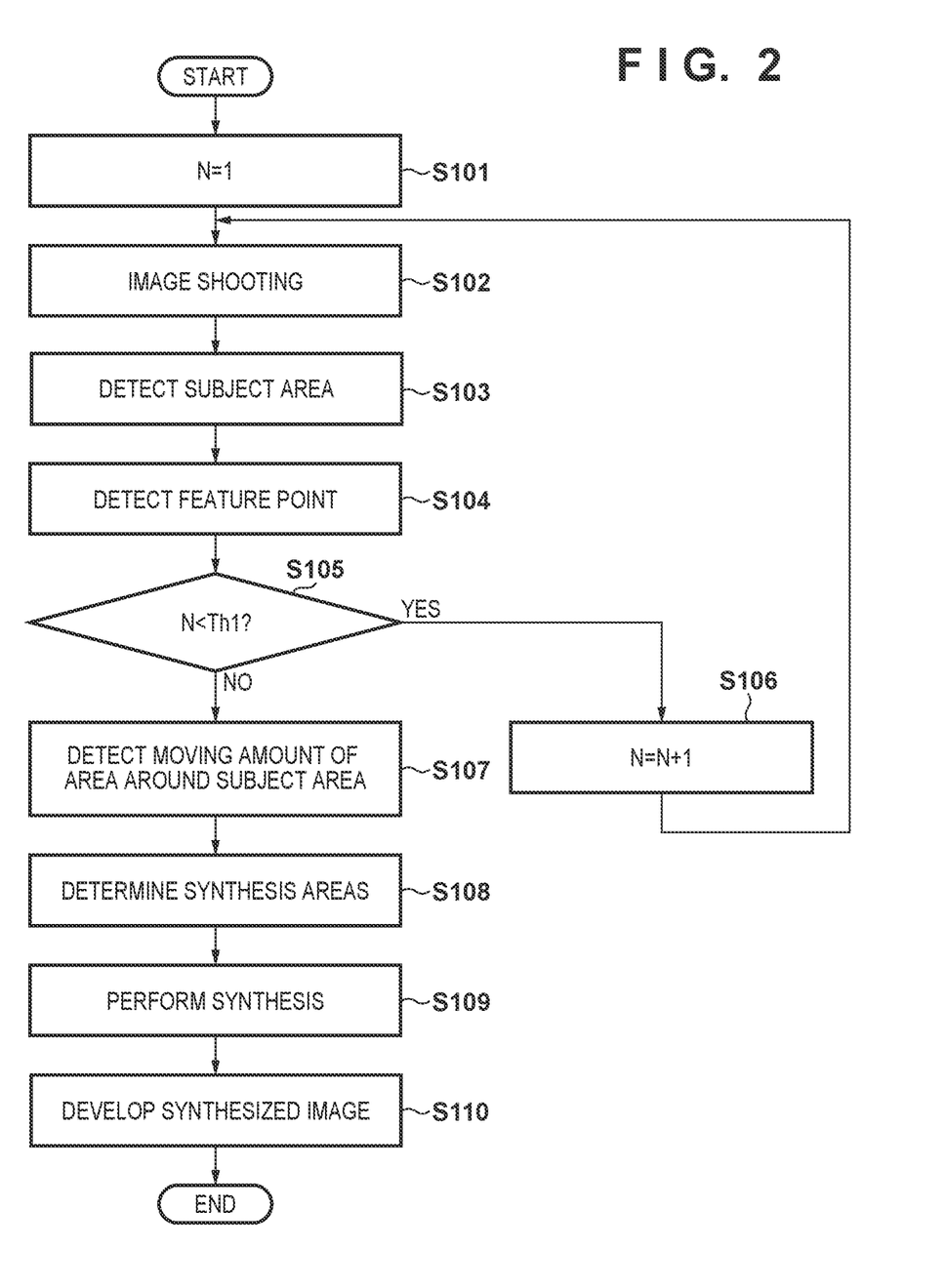
FIG. 2 is a flowchart showing shooting processing according to the first embodiment.
Figure 3A:
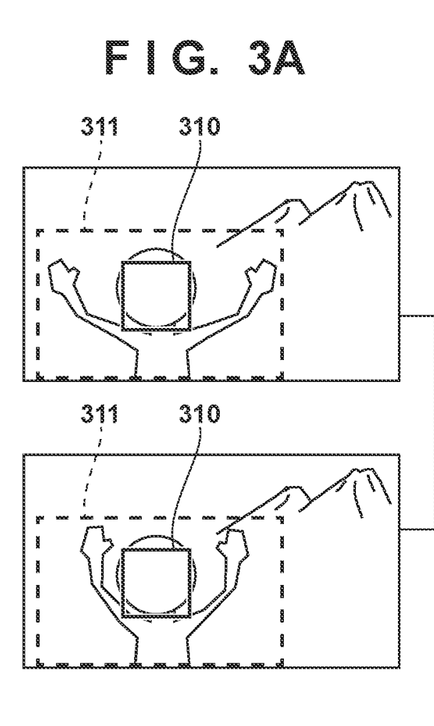
FIGS. 3A and 3B are conceptual diagrams for explaining the effects of the first embodiment.
Figure 3B:
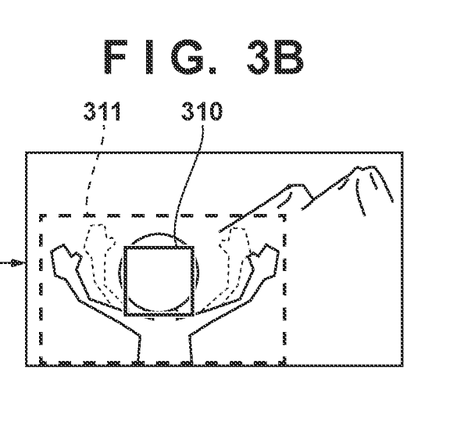

FIG. 2 is a flowchart showing a series of shooting processes performed by the image capturing apparatus 1000 in the first embodiment. FIGS. 3A and 3B are conceptual diagrams showing effects obtained by performing the processes shown in FIG. 2. In the synthesizing process according to the present embodiment, only partial areas of a plurality of continuously shot images are synthesized, and the areas to be synthesized are selected prior to the synthesizing.

The shooting processing shown in the flowchart of FIG. 2 is started when the image capturing apparatus 1000 issues an instruction to start shooting. Here, for example, when a sensor or the like different from the image capturing apparatus 1000 senses that, in an attraction which is subjected to shooting, a cart carrying people has arrived at a predetermined position, the main shooting process is started. Note that the start of shooting is not limited to this, and for example, shooting may be started in response to the user pressing a shutter button (not shown).

In step S101, a count value N of the counter 107 is set to one. Then, in step S102, the image sensor 101 performs shooting of the Nth image. In step S103, the subject area detection unit 103 detects an identifiable subject such as a person and its area (subject area) from the shot image. Here, a person's face area is detected as the subject area. In step S104, the feature point detection unit 105 detects feature points present in the shot image. The feature points are detected not only in the subject area but also in the background area. The feature points detected here are used to detect the amount of movement of a subject and of a peripheral area around the subject, which will be described later.

In step S105, the count value N is compared with a predetermined threshold Th1 indicating the number of images to be continuously shot, and it is determined whether or not the count value N is less than the threshold Th1. In the present embodiment, the threshold Th1 is set to an integer of 2 or more because continuous shooting is required to obtain the effect of synthesizing a plurality of images. When it is determined in step S105 that the count value N is less than the threshold Th1, the process proceeds to step S106, adds 1 to the count value N, returns to step S102, and performs the next shooting.

On the other hand, if it is determined in step S105 that the count value N is greater than or equal to the threshold Th1, the shooting is ended and the process proceeds to step S107. Note that the determination as to whether or not to continue shooting is not limited to the above method. For example, in step S105, if the shutter button is pressed to start shooting, it may be determined whether the shutter button has been released, or it may be determined based on the elapsed time from the start of shooting. In either case, it may be controlled so that at least two images are shot, and if the condition is not met, the process proceeds to step S106, and if the condition is met, the process proceeds to step S107.

In step S107, the second moving amount detection unit 111 detects the moving amounts of feature points existing around the subject area. For detection of the moving amounts, a known method of detection based on how much each feature point has moved between two consecutive images can be used. Here, since the subject area is the area of a person's face, in step S107, the moving amounts of the hands and feet existing around the person's face are detected. In this embodiment, a case will be described in which the moving amounts of feature points are detected between two consecutive images after continuous shooting is completed. However, the present invention is not limited to this, and, after the first image is shot, the detection may be performed sequentially at the time when each of the second and subsequent images is obtained.

In step S108, the synthesizing unit 110 sets an area in which the moving amounts detected by the second moving amount detection unit 111 are larger than a predetermined moving amount as a synthesis area to be used for synthesis in each image, based on the feature points present around the subject area in the series of images obtained by continuous shooting. Then, in step S109, the synthesizing unit 110 performs aligned synthesis for the set synthesis areas. In the aligned synthesis, it is possible to use a well-known synthesizing method of averaging synthesis areas of images to be synthesized with aligning feature points of successive images to the respective feature points of the first image. At this time, the synthesis areas of the images are aligned and synthesized so that the feature points of the face area (object area) match. By doing so, the displacement of the face area in the series of images obtained by continuous shooting is corrected, and the areas around the subject area where the moving amounts of the feature points are large are synthesized with the feature points are offset from each other. That is, it is possible to obtain an image in which the face area (subject area) is less blurry and the feature points around the subject area have dynamism. In addition, with respect to the areas not set as the synthesis areas, the area in the first image is arranged as it is and combined with the areas that has been subjected to aligned synthesis.

Further, in a case where a face is recognized as a subject, the aligned synthesis may be performed on the subject areas by weighting the movement of the feature points of the face among the synthesis areas. As a result, it is possible to obtain an image of the face portion with less blurring. Further, in a case where a face is recognized as a subject, one of the subject areas in the plurality of images may be selected based on the facial expression determined by the facial expression determination unit 106, or a plurality of subject areas may be selected and subjected to the aligned synthesis. At this time, for example, by excluding the subject areas of the subject whose eyes are closed or by selecting the subject areas of the subject determined to be smiling, it is possible to obtain an image with a more favorable facial expression.

In step S110, the development processing unit 112 develops the image synthesized in step S109, and stores the developed image in the storage unit 113, then the processing ends.

Next, effects obtained by the above-described processing will be described with reference to FIGS. 3A and 3B.

FIG. 3A shows an example of two consecutive images, and FIG. 3B shows an example of a synthesized image obtained by synthesizing the two images shown in FIG. 3A. A person's face area 310 is detected as a subject area from each image by the subject area detection unit 103. Further, it is schematically shown that the second moving amount detection unit 111 has detected that the arm is greatly moving in a peripheral area 311 between the face area 310 and a frame indicated by a dotted line.

In the image shown in FIG. 3B, the peripheral area 311 is formed by aligning and synthesizing the two images, and the area outside the peripheral area 311 is formed with the first image. Also, with respect to the face area 310, an image obtained by performing weighted aligned synthesis using the two images and/or an image or images selected by a selection process based on the facial expression determined by the facial expression determination unit 106 may be used alone or by combining them.

As described above, according to the first embodiment, aligned synthesis is performed only for areas in which the subject is moving. As a result, it is possible to obtain a clear image with dynamism, with no-blur background, and on the other hand, a less blurry face with a more desirable expression, and an arm with a large dynamic blur.

It should be noted that, in the description of the present embodiment, the case where there is a single subject in the images has been described as an example, however, in a case where a plurality of subjects are detected, since each subject has a different facial expression, selection of areas to be synthesized may be performed sequentially for each subject.

In addition, although a fixed-point camera is used as an image capturing apparatus in the present embodiment, the present invention is not limited to this, and may be applied to a hand-held camera such as a common digital camera.

Second Embodiment

Next, a second embodiment of the present invention will be described.

In the second embodiment, the processing described below is performed by the image capturing apparatus 1000 described in the first embodiment with reference to FIG. 1.

Figure 4:
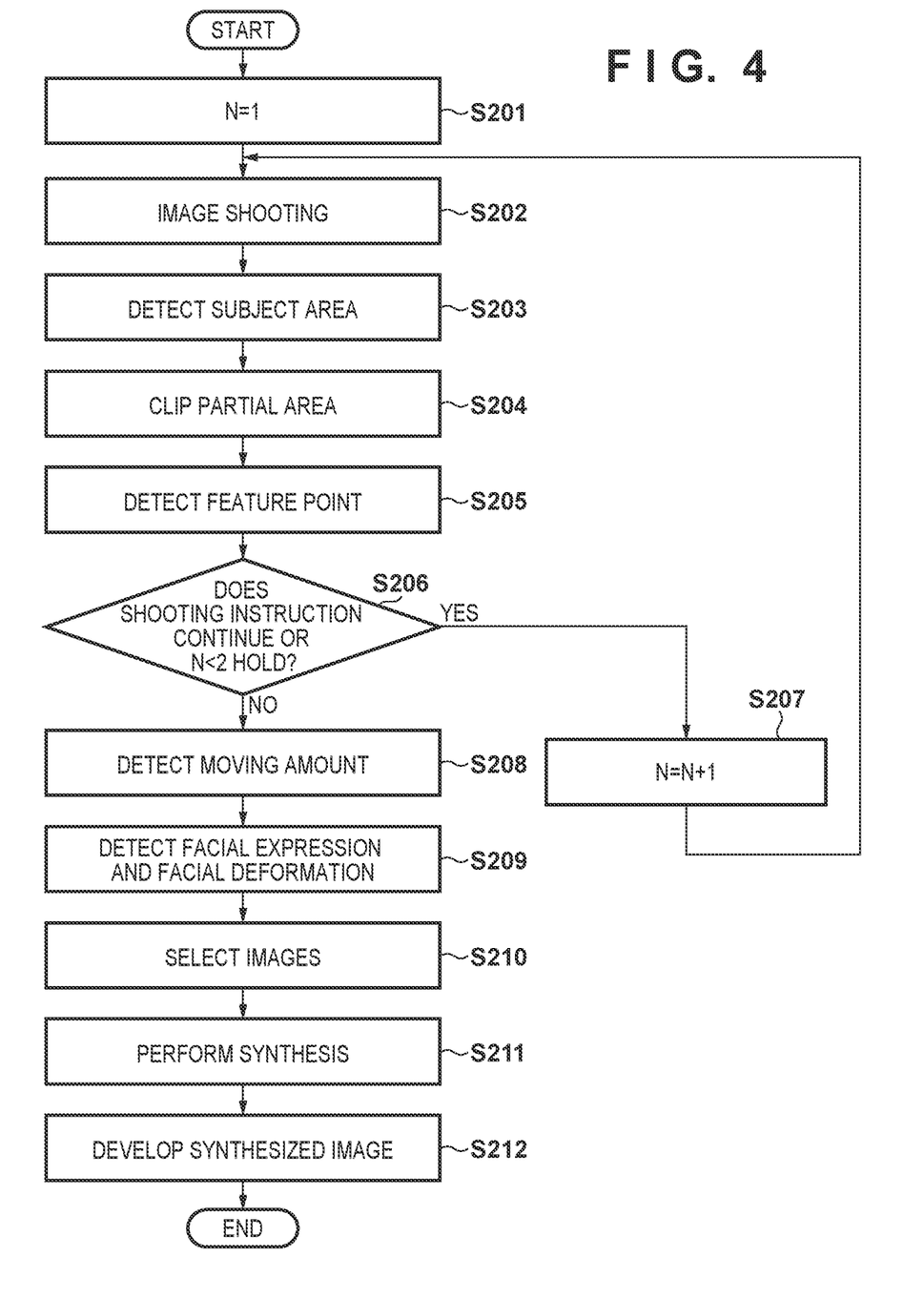
FIG. 4 is a flowchart showing shooting processing according to a second embodiment.
Figure 5A:
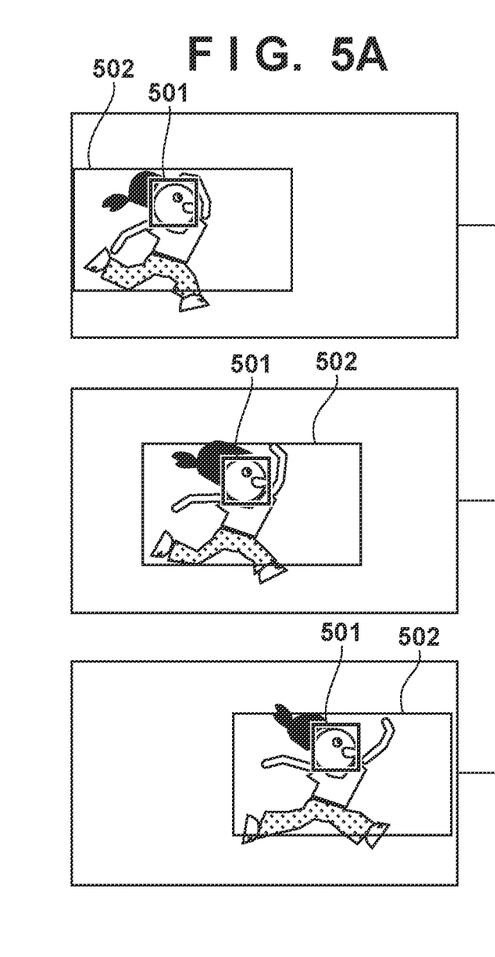
FIGS. 5A to 5C are conceptual diagrams for explaining the effects of the second embodiment.
Figure 5B:
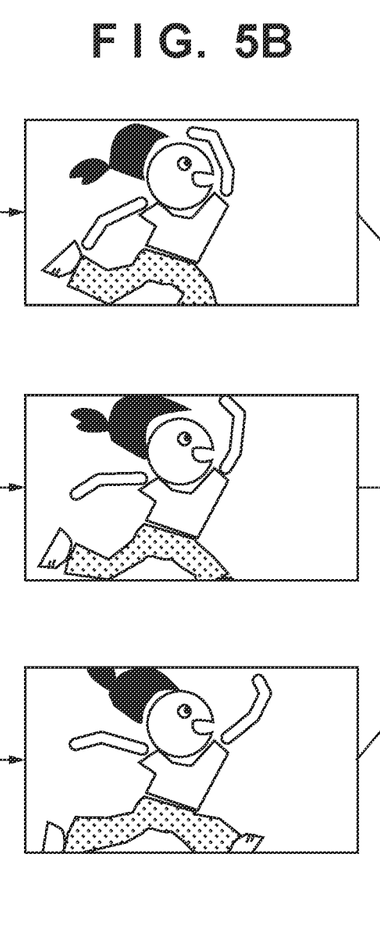
Figure 5C:
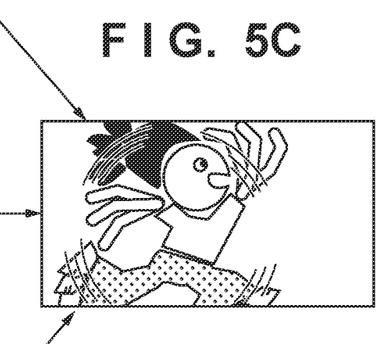

FIG. 4 is a flowchart showing a series of shooting processes performed by the image capturing apparatus 1000 in the second embodiment. FIGS. 5A to 5C are conceptual diagrams showing effects obtained by performing the processes shown in FIG. 4. In the synthesizing process according to this embodiment, in a case where a predetermined subject (for example, a person's face) is detected, images to be subjected to the synthesizing process are selected from a plurality of continuously shot images, and predetermined areas are clipped and synthesized.

The shooting processing shown in the flowchart of FIG. 4 is started when an instruction to start shooting is issued in the image capturing apparatus 1000, similarly to the shooting processing shown in FIG. 2. In the following description, it is assumed that shooting is started in response to depression of a shutter button (not shown).

In step S201, a count value N of the counter 107 is set to one. Then, in step S202, the image sensor 101 performs shooting of the Nth image. In step S203, the subject area detection unit 103 detects an identifiable subject such as a person and its area (subject area) from the shot image. Here, a human face area is detected as the subject area. In step S204, the clipping unit 104 clips a partial area including the subject area detected in step S203 and having a size obtained by multiplying the shooting angle of view by a predetermined magnification (1 or less). Here, as an example, the predetermined magnification is a ratio of a partial area to be clipped with respect to the shooting angle of view while keeping the aspect ratio of the shooting angle of view, wherein the partial area can include, for example, the detected subject area (face in FIGS. 5A to 5C).

Note that the predetermined magnification may be a ratio for clipping a partial area similar to the detected subject area (in this case, if the ratio of the subject area is 1, then the predetermined magnification is greater than 1). At this time, if the difference between the sizes of the partial areas to be clipped from images is large, that is, if the subject is approaching or moving away from the image capturing apparatus 1000, a process of resizing the images so that the sizes of the subject in the images become approximately the same may be included. By doing so, it is possible to acquire an image in which the size of the object is approximately constant and the background appears to flow radially by the synthesizing process described later.

In step S205, the feature point detection unit 105 detects feature points present in the partial area clipped in step S204.

In step S206, it is determined whether or not the shooting instruction continues. Here, it is determined whether or not the shutter button (not shown) is continuously pressed. It should be noted that, in this embodiment, it is necessary to perform continuous shooting in order to obtain the effect of synthesizing a plurality of images, so it is also determined whether the count value N is less than 2. If it is determined in step S206 that the shutter button is continuously pressed or the count value N is less than 2, the process proceeds to step S207, adds 1 to the count value N, returns to step S102, and performs the next shooting.

On the other hand, if it is determined in step S206 that the shutter button is released and the count value N is equal to or greater than 2, the shooting is ended and the process proceeds to step S208.

In step S208, the first moving amount detection unit 108 detects the moving amount of the area, clipped by the clipping unit 104 from the series of consecutively shot images, between two consecutive images. If the moving amount of the clipped partial area is large, it means that the movement of the subject whose image is to be acquired is large, and it is assumed that the dynamism of the subject is high. This detection result of the first moving amount detection unit 108 is used at the time of determining synthesizing processing conditions in the subsequent step.

Step S209 is a process performed in a case where the subject detected by the subject area detection unit 103 is a person's face, and the facial expression and facial deformation amount are detected by using the facial expression determination unit 106 and the deformation amount detection unit 109. Facial expression detection is performed using a known technique, and whether or not eyes are closed, whether the subject is smiling, and so forth, is detected, and the detected information is used as information for selecting an image to be used for synthesis, which will be described later. Further, the amount of deformation of the face is used to detect that the orientation of the face is within a predetermined range, and the detected information is used as information for selecting an image to be used for synthesis, which will be described later.

In step S210, the synthesizing unit 110 selects images to be used for synthesis from N=1 to N images. Specifically, images in which the moving amount of the partial area between the images obtained in step S208 is equal to or greater than a predetermined threshold value, and the facial expression and face deformation amount obtained in step S209 indicate that the images can be used for synthesis processing are selected.

It is desirable that the images to be selected are consecutive images so that the movement of the background has continuity. Accordingly, if continuous images are not selected under the above determination conditions, for example, a threshold for determining that the image next to the image selected as the image containing the partial area to be synthesized can be used for synthesis processing may be changed so that the possibility of the next image to be selected is increased. Alternatively, an image/images temporally sandwiched between two discontinuous images selected as images containing a partial area to be synthesized may be selected even if the above determination condition is not satisfied. In step S211, the synthesizing unit 110 aligns and synthesizes the partial areas to be synthesized in the selected images. It should be noted that the aligned synthesis performed here is performed in a similar manner to the synthesis performed in step S109 in FIG. 2.

Finally, in step S212, the development processing unit 112 develops the image synthesized in step S211, and saves the developed image in the storage unit 113, then the processing ends.

Next, the effects obtained by the above-described processing will be described with reference to FIGS. 5A to 5C.

FIG. 5A shows three consecutively captured images. Since the subject is a person, the subject area detection unit 103 detects a face area 501 as the subject area in step S203. Also, a partial area 502 is clipped in step S204, and FIG. 5B shows images of the partial area 502 clipped from each of the three images shown in FIG. 5A. It is assumed that these three partial areas 502 meet the selection conditions in step S210 and are subjected to synthesis.

FIG. 5C shows an image in which the three partial areas 502 shown in FIG. 5B are synthesized by the synthesizing unit 110 in step S211. As described above, this processing makes it possible to obtain an image of the subject with dynamism.

Although FIGS. 5A to 5C show the case where the subject moves within the imaging plane, the present invention is not limited to this. As described in step S204, when the subject moves in the direction of the optical axis of the image capturing apparatus 1000 (when the amount of change in the size of the subject area is greater than the threshold value), it is possible to acquire an image with a subject of a certain size with the background flowing radially by performing the resizing process.

By performing aligned synthesis on partial areas selected based on the moving amount, facial expression, and facial deformation amount of the subject in this way, it is possible to acquire a dynamic image with the background other than the subject flowing, while the subject having a face portion with less blurring.

As described above, according to the second embodiment, it is possible to shoot an image with a more preferable facial expression while expressing the dynamism of the subject, which has been difficult with the conventional method.

Note that the present embodiment may be applied to a fixed-point camera, a camera attached to a moving object, and a hand-held camera such as a common digital camera. In the case of a camera attached to a moving object, the partial areas used for aligned synthesis may be selected according to the speed of the moving object.

Third Embodiment

Next, a third embodiment of the present invention will be described.

Figure 6:
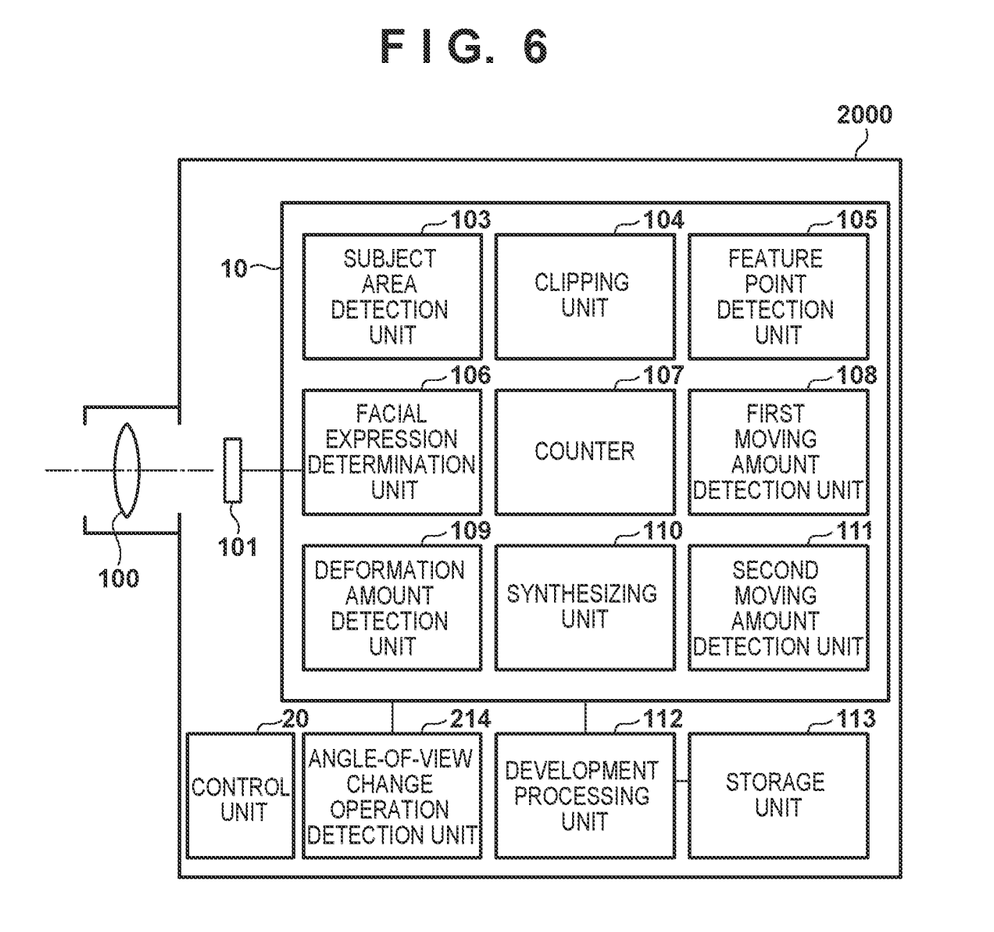
FIG. 6 is a block diagram showing a functional configuration of an image capturing apparatus according to a third embodiment.

FIG. 6 is a block diagram showing a functional configuration of an image capturing apparatus 2000 according to the third embodiment. The image capturing apparatus 2000 is a so-called digital camera, and in the present embodiment, mainly hand-held shooting is performed, and in particular, panning shooting in which the photographer follows a moving object while shooting will be described. Unlike the conventional panning shooting performed with one exposure, in the panning shooting performed by the image capturing apparatus 2000, a plurality of consecutively photographed images are subjected to aligned synthesis to obtain an image in which a main subject is clearly shown while background flows.

The functional configuration of the image capturing apparatus 2000 according to the third embodiment is that an angle-of-view change operation detection unit 214 is added to the image capturing apparatus 1000 described in the first embodiment with reference to FIG. 1. The angle-of-view change operation detection unit 214 detects whether or not the photographer has performed an operation to change the angle of view, such as panning, in order to fit the subject within the screen during panning. The angle-of-view change operation detection unit 214 uses an angular velocity sensor (not shown) used for image stabilization included in the image capturing apparatus 2000 to detect whether or not an angular velocity greater than or equal to a predetermined value is applied during shooting.

Further, in the third embodiment, the feature point detection unit 105 performs the feature point detection processing performed on the shot images also on live view images read out from the image sensor 101 in the shooting preparation state. Furthermore, the first moving amount detection unit 108 detects a movement amount of a subject between successive live view images. Based on these detection results, the clipping unit 104 determines whether the angle of view has been changed by panning, tilting, etc., and how well the direction in which the image capturing apparatus 2000 is facing matches the direction of the subject. As a result, it is possible for the clipping unit to change the size of the partial area to be clipped as described later. Other functional configurations are the same as those of the image capturing apparatus 1000 shown in FIG. 1, so the same reference numerals are given and the description thereof is omitted.

Figure 7:
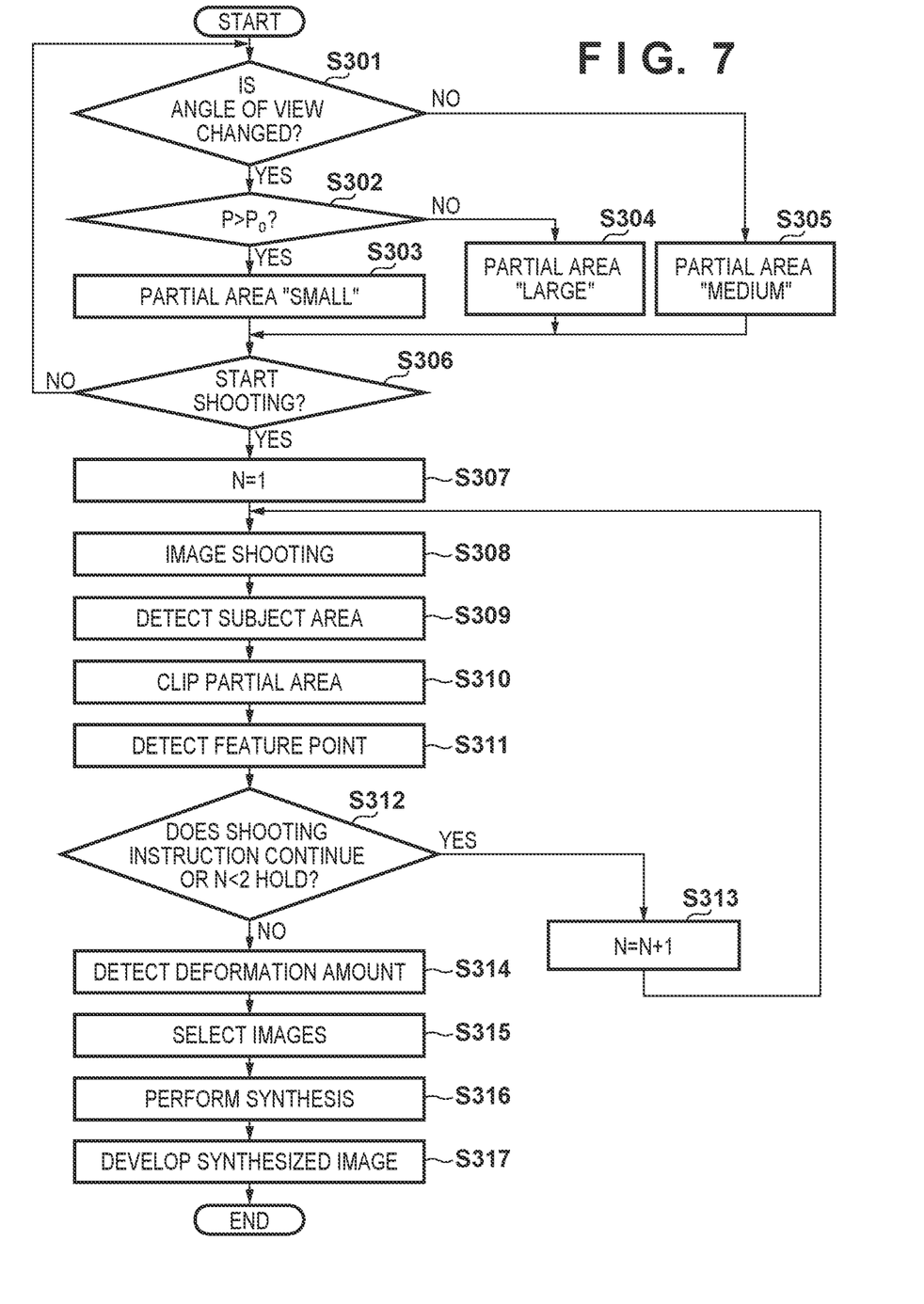
FIG. 7 is a flowchart showing shooting processing according to the third embodiment.

FIG. 7 is a flowchart for explaining the angle-of-view change processing in this embodiment, which is performed by the image capturing apparatus 2000. This processing starts when the image capturing apparatus 2000 is ready for shooting and the so-called aiming operation is started before the photographer determines the shooting angle of view.

In step S301, the angle-of-view change operation detection unit 214 determines whether or not the angle of view is being changed by panning or tilting, for example, based on the angular velocity detected by the angular velocity sensor. Normally, in a case of performing panning shooting, the camera starts panning and/or tilting immediately before a shooting instruction is given, not after the shooting instruction is given, so that a subject to be shot is within the angle of view. Therefore, it can be determined whether panning shooting will be performed based on the determination result. In this embodiment, the angle-of-view change operation detection unit 214 uses the angular velocity sensor, but the present invention is not limited to this, and in a case where a mode for performing panning shooting is selected, the process may proceed to step S302.

If it is determined in step S301 that the angle of view has not been changed, the process advances to step S305, and the size of the partial area to be clipped in step S309, which will be described later, is set to "medium".

On the other hand, if it is determined in step S301 that the angle of view has not been changed, the process proceeds to step S302.

In step S302, the eligibility of the angle-of-view changing operation is determined. More specifically, the subject is detected in the live view images described above, and it is determined whether or not a moving amount P of the detected subject is greater than a threshold P0. If the moving amount P is determined to be greater than the threshold P0, the process proceeds to step S303, and if determined to be equal to or less than the threshold P0, the process proceeds to step S304.

In step S303, the size of the partial area to be clipped in step S309, which will be described later, is set to "small". On the other hand, in step S304, the size of the partial area to be clipped is set to "large".

Figure 8A:
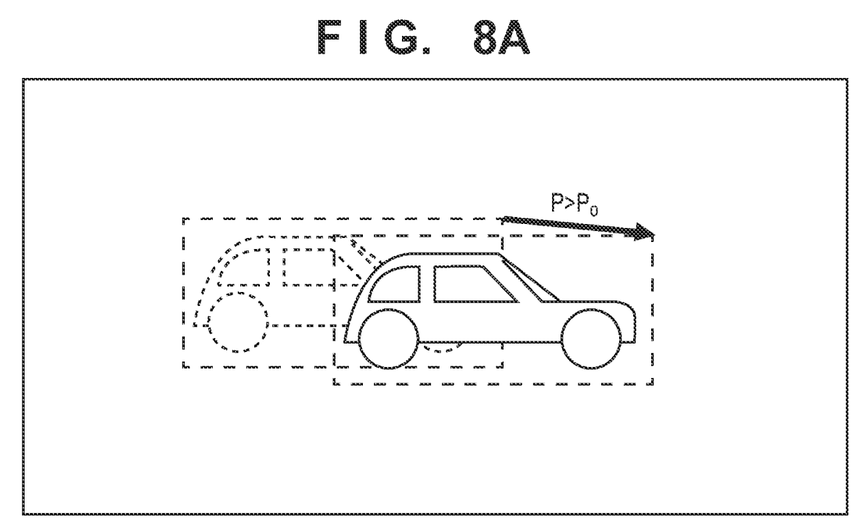
FIGS. 8A and 8B are schematic diagrams for explaining an amount of movement in angle-of-view change processing according to the third embodiment.
Figure 8B:
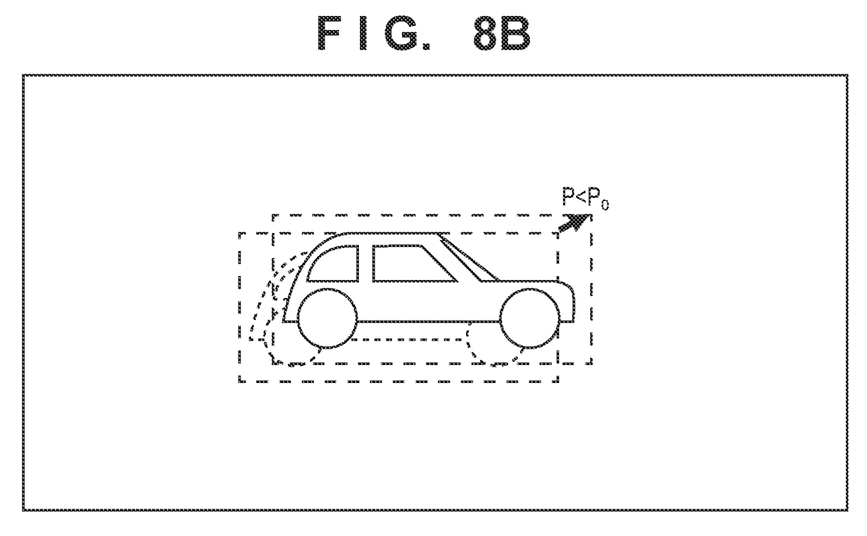

Here, the moving amount P of the subject between the live view images determined in step S302 of FIG. 7 will be described with reference to FIGS. 8A and 8B. FIG. 8A and FIG. 8B show two consecutive live view images superimposed in states where the moving amount P of the subject on the live view images is large and small, respectively.

FIG. 8A shows a state in which the moving amount P of the subject between the live view images is larger than the threshold P0, and represents a state in which the subject is not tracked well by panning. Therefore, if a wide partial area is clipped for aligned synthesis, there is a high possibility that part of the partial area may be out of the shot image. Accordingly, by setting the size of the partial area to be clipped in step S303 to be small, it becomes possible to easily capture the target subject in the shot image.

FIG. 8B shows a state in which the moving amount P of the subject between the live view images is equal to or less than the threshold P0, and represents a state in which the subject is successfully tracked by panning. Accordingly, it is expected that images with similar compositions can be obtained with little subject shift between images that are subsequently shot continuously, and that even if large partial areas are clipped, it is unlikely that the partial areas will be out of the shot image. Therefore, by setting the size of the partial area to be clipped in step S304 to be large, it is possible to acquire a panning shot image with a wider angle of view.

After setting of the clipping amount is finished, in step S306, it is determined whether or not shooting has been instructed by, for example, pressing a shutter button (not shown). If no shooting instruction has been issued, the process returns to step S301 and repeats the above-described processes. If it is determined in step S306 that the shooting instruction has been issued, the process advances to step S307 to set the count value N of the counter 107 to one. Then, in step S308, the image sensor 101 takes the Nth image. In step S309, the subject area detection unit 103 detects a predetermined subject and its area (subject area) from the shot image. Then, in step S310, the clipping unit 104 clips a partial area including the subject area detected in step S309 and having a size set in any of steps S303 to S305.

Here, the size indicates the magnification corresponding to a ratio of a partial area to be clipped whose shape is similar to the detected subject area with respect to the detected subject area, and the magnification is 1 or more with respect to the size of the subject area. For example, a partial area having 1.2 times as large as the detected subject area in the vertical and horizontal directions with the center of the subject area being the center of the partial area is clipped if the set size is "medium", 1.1 times if the set size is "small", and 1.3 times if the set size is "large". Note that the magnitudes of the magnification are not limited to these, and can be changed as appropriate.

In step S311, the feature point detection unit 105 detects feature points existing in the partial area clipped in step S310.

In step S312, it is determined whether or not the shooting instruction continues. Here, the same determination as in step S206 in the second embodiment is performed. If the shooting instruction continues in step S312, the process proceeds to step S313, adds 1 to the count value N, and returns to step S308 to perform the next shooting.

On the other hand, if it is determined in step S312 that the shooting instruction does not continues, the shooting is ended, and the process proceeds to step S314.

In step S314, the deformation amount detection unit 109 uses the feature points detected in step S311 to obtain the deformation amount of the subject detected by the subject area detection unit 103. Here, for example, assuming that the state of the subject in the image obtained immediately after the shutter button is pressed in step S306 is the state of the subject intended by the photographer, this image is used as a reference image, and a deformation amount of a subject detected from an image other than the reference image with respect to a subject detected from the reference image is obtained. Note that the way to select the reference image is not limited to this, and a plurality of obtained images may be displayed and the photographer may select one of them.

In step S315, the synthesizing unit 110 selects images to be used for synthesis from N=1 to N images. Specifically, images having the subject whose deformation amounts detected in step S314 are smaller than a predetermined threshold value are selected. Here, as in step S210, it is desirable that the images to be selected are consecutive images so that the movement of the background has continuity, so successive images may be set easier to be selected in the similar manner as in step S210. In step S316, the synthesizing unit 110 performs aligned synthesis on the partial areas to be synthesized in the selected image. It should be noted that the aligned synthesis here is performed by the same processes as in step S109 in FIG. 2.

Finally, in step S317, the development processing unit 112 develops the image synthesized in step S314, and stores the developed image in the storage unit 113, then the processing ends.

As described above, according to the third embodiment, it is possible to obtain a good panning image by selecting a clipping amount of an appropriate size and performing aligned synthesis when performing panning shooting.

Other Embodiments

The present invention may be applied to a system composed of a plurality of devices or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102865, filed Jun. 27, 2022 which is hereby incorporated by reference herein in its entirety.

What is claimed is:

1. An image processing apparatus comprising one or more processors and/or circuitry which function as:
   a first detector that detects a subject area of a predetermined subject from each of a plurality of images;
   a second detector that detects a partial area of a predetermined size that includes the subject area from each of the plurality of images;
   a feature point detector that detects a feature point of an image;
   a determination unit that determines facial deformation amount in a case where the subject area is of a person's face; and
   a synthesizer that synthesizes the partial areas of the plurality of images so that the feature points in the subject areas match each other,
   wherein, with respect to the subject area of the partial area, the synthesizer selects the subject areas including a person's face whose facial deformation amount is smaller than a predetermined threshold from the subject areas of the plurality of images and synthesizes the selected subject areas.

2. The image processing apparatus according to claim 1, wherein the second detector detects an area where a moving amount of the feature point, detected around the subject area, between consecutive images is larger than a predetermined moving amount as the partial area.

3. The image processing apparatus according to claim 1, wherein the one or more processors and/or circuitry further function as a second determination unit that determines facial expression in a case where the subject area is of a person's face,
   wherein, with respect to the subject area of the partial area, the synthesizer selects the subject areas including a person's face whose facial expression satisfies a predetermined condition from the subject areas of the plurality of images and synthesizes the selected subject areas.

4. The image processing apparatus according to claim 1, wherein the synthesizer further synthesizes the synthesized partial area with an area other than the partial area in one of the plurality of images.

5. The image processing apparatus according to claim 1, wherein the one or more processors and/or circuitry further function as a third detector that detects a moving amount of the partial area between consecutive images among the plurality of images, and the synthesizer selects the partial areas whose moving amount is larger than a predetermined moving amount from the partial areas of the plurality of images and synthesizes the selected partial areas.

6. The image processing apparatus according to claim 1, wherein the one or more processors and/or circuitry further function as:
a third detector that detects a moving amount of the subject area between consecutive images among the plurality of images; and
a setting unit that sets a size of the partial area based on the moving amount,
wherein the setting unit sets the size of the partial area to be smaller in a case where the moving amount is a second moving amount which is larger than a first moving amount than in a case where the moving amount is the first moving amount.

7. The image processing apparatus according to claim 6, wherein the one or more processors and/or circuitry further function as a determination unit that determines a deformation amount between the subject area of a reference image to be referenced among the plurality of images and the subject area of an image other than the reference images,
wherein the synthesizer selects the partial area including the subject area whose deformation amount is smaller than a predetermined threshold and synthesizes the selected partial area with the partial area of the reference image.

8. An image capturing apparatus comprising:
an image sensor; and
one or more processors and/or circuitry which function as:
a first detector that detects a subject area of a predetermined subject from each of a plurality of images shot by the image sensor;
a second detector that detects a partial area of a predetermined size that includes the subject area from each of the plurality of images;
a feature point detector that detects a feature point of an image;
a determination unit that determines facial deformation amount in a case where the subject area is of a person's face; and
a synthesizer that synthesizes the partial areas of the plurality of images so that the feature points in the subject areas match each other,
wherein, with respect to the subject area of the partial area, the synthesizer selects the subject areas including a person's face whose facial deformation amount is smaller than a predetermined threshold from the subject areas of the plurality of images and synthesizes the selected subject areas.

9. An image processing method comprising:
detecting a subject area of a predetermined subject from each of a plurality of images;
detecting a partial area of a predetermined size that includes the subject area from each of the plurality of images;
detecting a feature point of an image;
determining facial deformation amount in a case where the subject area is of a person's face; and
synthesizing the partial areas of the plurality of images so that the feature points in the subject areas match each other,
wherein, with respect to the subject area of the partial area, in the synthesizing, the subject areas including a person's face whose facial deformation amount is smaller than a predetermined threshold are selected from the subject areas of the plurality of images and the selected subject areas are synthesized.

10. An image processing apparatus comprising one or more processors and/or circuitry which function as:
a first detector that detects a subject area of a predetermined subject from each of a plurality of images;
a second detector that detects a partial area of a predetermined size that includes the subject area from each of the plurality of images;
a feature point detector that detects a feature point of an image;
a third detector that detects a moving amount of the subject area between consecutive images among the plurality of images;
a setting unit that sets a size of the partial area based on the moving amount; and
a synthesizer that synthesizes the partial areas of the plurality of images so that the feature points in the subject areas match each other,
wherein the setting unit sets the size of the partial area to be smaller in a case where the moving amount is a second moving amount which is larger than a first moving amount than in a case where the moving amount is the first moving amount.

11. The image processing apparatus according to claim 10, wherein the one or more processors and/or circuitry further function as a determination unit that determines a deformation amount between the subject area of a reference image to be referenced among the plurality of images and the subject area of an image other than the reference images,
wherein the synthesizer selects the partial area including the subject area whose deformation amount is smaller than a predetermined threshold and synthesizes the selected partial area with the partial area of the reference image.

12. An image capturing apparatus comprising:
an image sensor; and
one or more processors and/or circuitry which function as:
a first detector that detects a subject area of a predetermined subject from each of a plurality of images shot by the image sensor;
a second detector that detects a partial area of a predetermined size that includes the subject area from each of the plurality of images;
a feature point detector that detects a feature point of an image;
a synthesizer that synthesizes the partial areas of the plurality of images so that the feature points in the subject areas match each other;
a third detector that detects a moving amount of the subject area between consecutive images among the plurality of images; and
a setting unit that sets a size of the partial area based on the moving amount,
wherein the setting unit sets the size of the partial area to be smaller in a case where the moving amount is a second moving amount which is larger than a first moving amount than in a case where the moving amount is the first moving amount.

13. An image processing method comprising:
detecting a subject area of a predetermined subject from each of a plurality of images;
detecting a partial area of a predetermined size that includes the subject area from each of the plurality of images;
detecting a feature point of an image;

detecting a moving amount of the subject area between consecutive images among the plurality of images;

setting a size of the partial area based on the moving amount; and synthesizing the partial areas of the plurality of images so that the feature points in the subject areas match each other, wherein, in the setting, the size of the partial area is set to be smaller in a case where the moving amount is a second moving amount which is larger than a first moving amount than in a case where the moving amount is the first moving amount.

\* \* \* \* \*